April 12, 1927.
J. SLEPIAN
1,624,370
VOLTAGE REGULATOR
Filed April 21, 1924
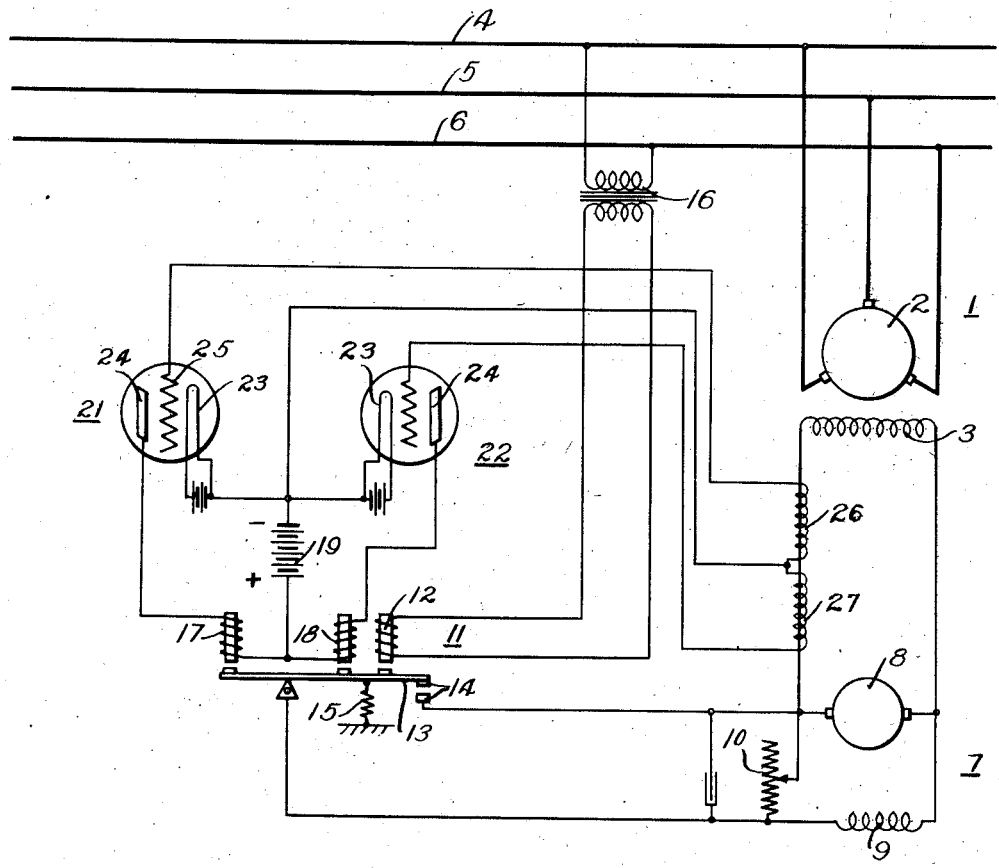
WITNESSES:
INVENTOR
Joseph Slepian
BY
ATTORNEY Patented Apr. 12, 1927.

1,624,370

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

VOLTAGE REGULATOR.

Application filed April 21, 1924. Serial No. 707,844.

My invention relates to voltage regulators for dynamo-electric machines.

One object of my invention is to provide a regulator that shall be simple but effective in operation and require but few mechanical parts.

Another object of my invention is to provide anti-hunting means for voltage regulators, and the like, which shall be quick-acting and of simple construction.

Still further objects of my invention will appear from the following specification. More particularly, my invention relates to a regulating system wherein the voltage of the main generator is controlled by varying the resistance in the field-winding circuit of an exciter generator that is employed to energize the field-winding circuit of the main machine. The resistance in circuit with the field-winding of the exciter is shunted by an electrically operated relay. Such a regulator, without the provision of special anti-hunting means, is unsatisfactory because of the excessive hunting action caused by the time lag between the change in voltage of the exciter generator and the change in voltage of the main generator, on account of the energy stored in the main generator field-magnet structure.

For the purpose of overcoming this hunting action, I provide means sensitive to the rate of change of the generator field-winding current for modifying the action of the voltage relay, so that the relay is sensitive in part to the voltage of the generator and in part to the changing field strength of the generator.

My invention will be better understood by reference to the accompanying drawing, in which the single figure is a diagrammatic view of apparatus used as an embodiment of the invention.

A generator 1, which is provided with a three-phase armature winding 2 and a field winding 3, is connected to a power line 4—5—6. The field winding 3 is energized from an exciter generator 7 that is provided with an armature winding 8 and a field winding 9. In circuit with the field winding 9 is a resistor 10 that is adapted to be shunted by the action of a relay 11. The relay 11 comprises an electromagnet 12 for actuating an armature 13 to operate contact members 14 against the tension of a spring 15.

The electro-magnet 12 is energized in accordance with the voltage of the power circuit 4—5—6, through a transformer 16. Electro-magnets 17 and 18 are also provided upon relay 11, on opposite sides of the armature fulcrum point, and are adapted to be energized from a battery 19, in accordance with the action of thermionic tubes 21 and 22, of a well-known type. Thermionic tubes 21 and 22 are provided with filaments 23, plate members 24 and grids 25. The grids 25 are sensitized from transformers 26 and 27, which are connected in series relation with the exciter generator 8 and the field winding 3. It will be noted that the magnets 17 and 18 are so positioned as to attract points on the armature 13 on opposite sides of the fulcrum point thereof, so that an increase in the energization of these two magnets influences the armature 13 oppositely.

The operation of the device is as follows: Let us suppose the voltage of the generator is too high. Then the increased excitation of the electromagnet 12 causes the contact members 14 to open and thereby insert the resistor 10 in series relation with the field winding 9, so that the voltage of the exciter generator begins falling. The field current of the main generator also begins falling, but, by reason of the inductance in the field circuit, it lags behind the exciter voltage. If the thermionic device operating the magnets 17, 18 was absent, the contact members 14 would stay open until the field-winding current of the main generator, was reduced to its proper value, but by this time the exciter voltage would be too low to maintain this field current, which would continue to fall, and so hunting action with respect to the voltage would set in.

On the other hand, the thermoinic device operating magnets 17, 18, when the field-winding current of the generator is decreasing by reason of the voltage induced in transformers 26, 27 affecting the grids 25, causes the contact members 14 to close sooner than they would otherwise, and this reduces the amount by which the exciter voltage will "overshoot" the proper value. Since the grids of the tubes 21 and 22 are connected respectively to the opposite ends of the current transformers 26 and 27, a change in the rate of current flow through the field winding 3 will cause a current to flow from the transformers, increasing the potential of one grid and decreasing the potential of the other grid, depending upon the direction of current flow in the secondary of the current transformers. Consequently, the change in the flow of current in the two circuits comprising the electromagnets 17 and 18 will be opposite in direction, the current in one circuit increasing as the current in the other circuit decreases. By proper proportion of the transformers 26 and 27, this overshooting of the exciter voltage may be reduced to substantially zero. Similarly, when the field-winding current of the main generator is increasing, the magnets 17, 18 cause the contact members 14 to open sooner than they would otherwise do, so that the exciter voltage is prevented from overshooting too high a value.

The unbalanced pull of the electro-magnets 17 and 18 exists only while the rate of flow of current through the field winding 3 would affect the transformers 26 and 27. The degree of energization of the magnets 17 and 18 will, however, be proportional to the rate of change of current flow in the circuit of the field-winding 3.

Many modifications of the apparatus disclosed may be made within the spirit and scope of my invention, and I do not wish to be limited other than by the appended claims.

I claim as my invention:

1. In a regulator system, a dynamo-electric machine having a field winding, regulating means for controlling the excitation of said field winding in accordance with the electrical conditions of said machine, anti-hunting means therefor comprising a pair of thermionic valves, and means for sensitizing said valves to permit current flow therethrough in accordance with changes in field excitation.

2. In a regulator system, a dynamo-electric machine having a field winding, regulating means for controlling the excitation of said field winding in accordance with the electrical conditions of said machine, anti-hunting means therefor comprising electro-responsive means for modifying the action of said regulating means, thermionic means for governing said electro-responsive means, and means for sensitizing said thermionic means in accordance with changes in the excitation of said field winding.

3. In a regulator system, a dynamo-electric machine provided with a field winding, means for governing the excitation of said field winding comprising a vibratory relay actuated in accordance with the voltage of said machine, anti-hunting means comprising electro-responsive means for biasing the action of said relay, and means for controlling said electro-responsive means in accordance with changes in the excitation of said field winding comprising a thermionic element.

4. In a regulator system, a dynamo-electric machine provided with a field winding, means for governing the excitation of said field winding comprising a vibratory relay actuated in accordance with the voltage of said machine, anti-hunting means comprising a pair of electro-responsive means for biasing the action of said relay, a thermionic valve connected to each electro-responsive means for controlling the energization thereof, means adapted to sensitize said valves in accordance with the direction and rate of change in field excitation of said dynamo-electric machine.

5. In a regulator system, a dynamo-electric machine provided with a field winding, means for governing the excitation of said field winding comprising a vibratory relay actuated in accordance with the voltage of said machine, anti-hunting means comprising a pair of electro-responsive means for biasing the action of said relay, a thermionic valve connected in circuit with each of said electro-responsive elements, and inductive means connected to said valves and responsive to changes in the field excitation of said dynamo-electric machine for sensitizing said valves.

In testimony whereof, I have hereunto subscribed my name this 9th day of April. 1924.

JOSEPH SLEPIAN.